R. D. MERSHON.
ELECTROLYTIC CONDENSER AND METHOD OF OPERATING THE SAME.
APPLICATION FILED JAN. 4, 1910.

1,132,957.

Patented Mar. 23, 1915.
2 SHEETS—SHEET 1.

Witnesses:
O. J. Walsh
S. S. Dunham

R. D. Mershon,
Inventor

By his Attorneys
Kerr, Page, Cooper & Hayward

R. D. MERSHON.
ELECTROLYTIC CONDENSER AND METHOD OF OPERATING THE SAME.
APPLICATION FILED JAN. 4, 1910.

1,132,957.

Patented Mar. 23, 1915.
2 SHEETS—SHEET 2.

Witnesses:

R. D. Mershon,
Inventor

By his Attorneys

UNITED STATES PATENT OFFICE.

RALPH D. MERSHON, OF NEW YORK, N. Y.

ELECTROLYTIC CONDENSER AND METHOD OF OPERATING THE SAME.

1,132,957.  Specification of Letters Patent.  Patented Mar. 23, 1915.

Application filed January 4, 1910.  Serial No. 536,355.

*To all whom it may concern:*

Be it known that I, RALPH D. MERSHON, residing at New York, in the county and State of New York, have invented certain new and useful Improvements in Electrolytic Condensers and Methods of Operating the Same, of which the following is a full, clear, and exact description.

In my copending application Ser. No. 524,874, filed October 27, 1909, I have pointed out that the action of the so-called electrolytic condenser depends, for high efficiency in continued operation, upon the maintenance of a negative charge in the electrolyte outside of the dielectric films which are formed on the condenser electrodes. There is a constant tendency of this charge to diminish, as by leakage through the films or over insulation, etc., with resulting flow of impressed current from the electrolyte to the electrodes and consequent "perforation" of the films on the latter; thereby causing deterioration of the films, corrosion and ultimate disintegration of the plates, and, of course, great loss of efficiency in the operation of the condenser. In the application mentioned I have also described, and claimed broadly, an invention in which this electrolyte charge is supplied or maintained by auxiliary exciting means, so that, as there is no appreciable diminution of such charge, flow of current from the electrolyte to the electrodes is prevented or reduced to a negligible amount.

My present invention is in the nature of an improvement in the above, and will be readily understood from the subjoined description of several convenient and effective embodiments.

Figure 1:
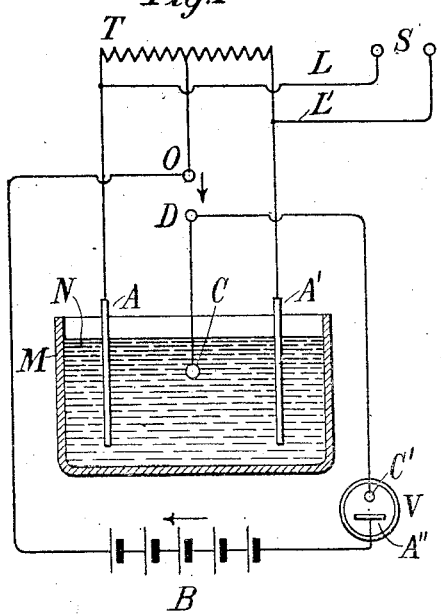
Figure 2:
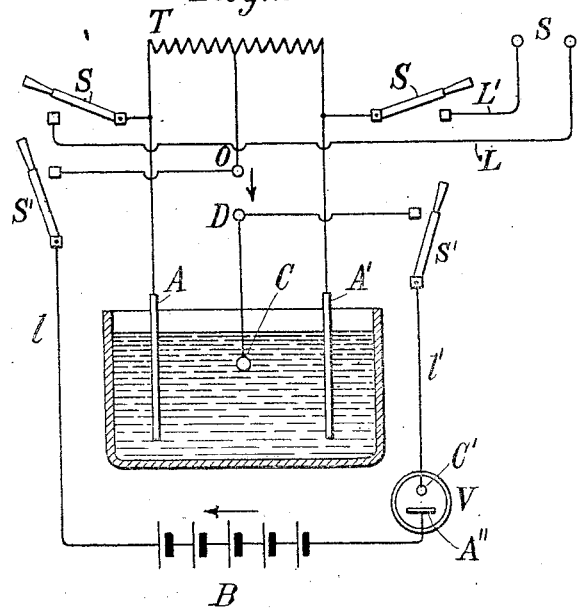

In the annexed drawings, Figure 1 illustrates diagrammatically one form of the invention described and claimed broadly in my prior application referred to, and is in its essential features the same as that shown in Fig. 7 of said prior application, being introduced here for convenience of description. Figs. 2, 3, 4, and 5 show diagrammatically several effective embodiments of my present invention.

The electrolytic condenser shown in Fig. 1 comprises a tank M, containing a suitable electrolyte N, for example a solution of borax, sodium or ammonium phosphate, citric acid, or other suitable chemical, and two or more electrodes as A, A', of aluminum or other film-forming metal. Immersed in the electrolyte is a non-filming electrode C, of carbon or other suitable material, connected to the negative pole of a battery B, the positive pole of which is connected to the middle point of an auto-transformer T. The terminals of the latter are connected to the supply leads L, L', which are also connected to the condenser electrodes A, A', respectively.

From the principle involved in both electrolytic rectifiers and condensers, namely, that current can flow from the electrolyte to the film-coated electrodes with little or no opposition but is strongly opposed in the other direction, it will be seen that when an alternating E. M. F., single phase in the present case, is impressed upon the device through the supply leads from a suitable source of current, S, a unidirectional E. M. F. will be produced between the terminals O and D, tending to produce a unidirectional current in the direction of the arrow between these points. This E. M. F. is opposed, however, by the battery voltage, so that so long as the latter voltage is just equal to the former no current can flow either to or from the battery; but if there should occur any leakage of the negative charge of the electrolyte, which would result in diminishing the difference of potential between O and D, current will flow from the battery to the condenser in sufficient amount to replace the charge or the part of the charge so lost. The battery thus constitutes an auxiliary exciting means, and its use as described obviates the necessity or possibility of perforation and consequent deterioration of the condenser films. To insure this result with certainty the voltage of the battery should be slightly in excess of that produced between O and D by the alternating current impressed upon the apparatus. If the battery E. M. F. be less than that between O and D current will flow across these points and charge the battery, which would of course mean current flowing from the electrode C to the plates A, A', and perforation of the films thereon. To guard against this contingency an "electric valve" of any well known type may be inserted in circuit with the battery to prevent flow of current from the condenser to the battery. A convenient type of valve is shown at V, comprising a non-filming electrode C′ and a film-coated electrode A″ immersed in a suitable electrolyte, the first-named electrode being connected to the terminal D and the other to the negative pole of the battery.

After the condenser has been put in operation the only function of the exciter (in Fig. 1 the battery B) is to maintain the negative charge in the electrolyte, that is, to compensate for any leakage that may occur through the films or over insulation, which function will of course require only a small amount of current from the exciter. But if the condenser should stand idle for some time, with the exciter disconnected or inactive, the charge may leak away in whole or in large part, and in such case if the condenser and exciter be simultaneously switched on to the supply circuit the exciter must, in a quarter cycle or less, furnish such portion of the necessary electrolyte charge as is missing. If this portion is not supplied by the exciter it will be initially supplied from the supply circuit, with perforation of one or more of the films on the condenser electrodes. This possibility may be avoided by leaving the exciter operatively in circuit with the condenser at all times, which would mean continued expenditure of power, and hence waste, when the condenser is not in use; or, by making the exciter of sufficient capacity to bring the electrolyte charge up to normal in a quarter cycle or less, which would mean an exciter of larger capacity than is necessary in steady operation.

As both the above methods are disadvantageous in the respects mentioned I prefer to secure the desired normal excitation by switching the exciter into circuit with the condenser before the latter is operatively connected up with the supply leads, so as to insure complete restoration of the electrolyte charge by the exciter before the current from the supply leads is operatively impressed on the condenser. This method of operating the condenser, and the means for practising the same, form the subject of my present application.

Various means may be employed for making the connections in the sequence or order described above. For example, in Fig. 2, which is otherwise identical with Fig. 1 and answers to the same description, I have shown simple switches S, S′, in the supply leads L, L′, and the exciter leads I, I′, respectively. In this construction, when the condenser is to be put into operation the switches S′ are closed first and the exciter allowed to bring the excitation up to normal, after which the switches S are closed. The exciter circuit need be closed only a few cycles ahead of the condenser circuit to insure full excitation, and hence the interval of time required will in general be very small, a fraction of a second being amply sufficient in any case unless the capacity of the exciter be relatively quite small.

Figure 3:
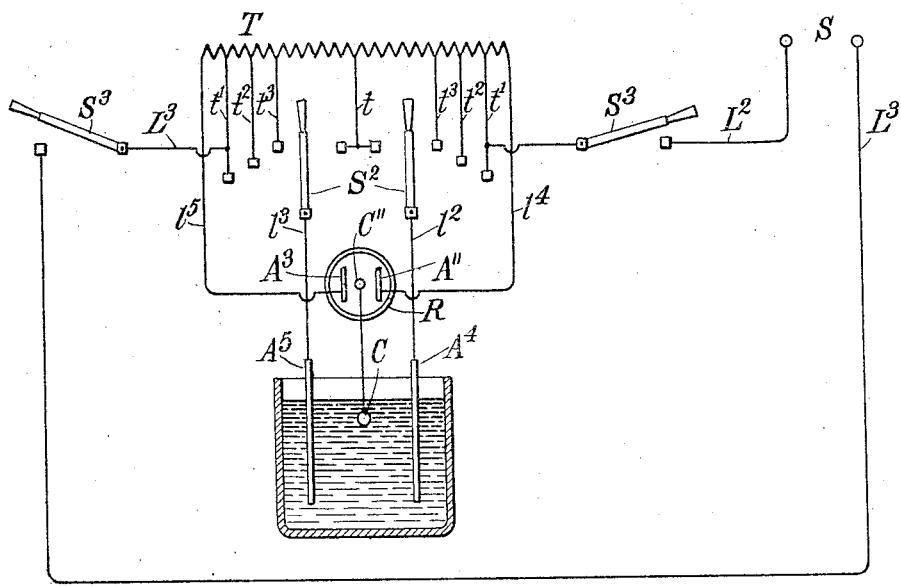
Figure 4:
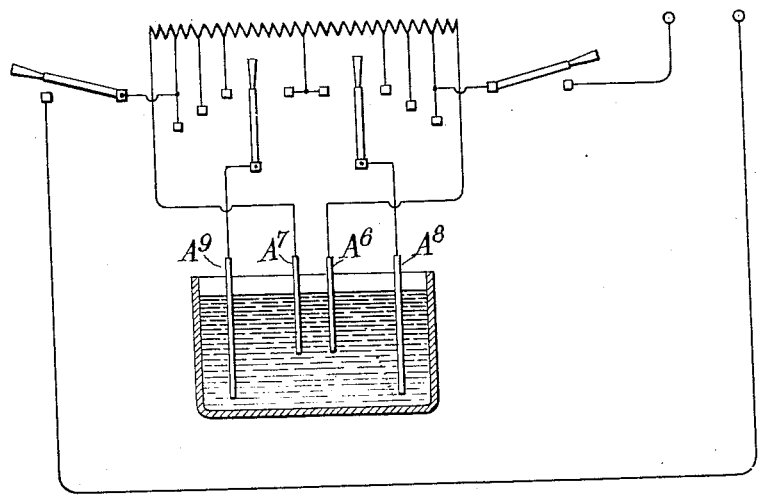

In the arrangement shown in Fig. 3 the exciting current is supplied by the main source of current through the instrumentality of the auto-transformer T and the exciter R, the latter being a small electrolytic rectifier consisting of a non-filming electrode C″ and two film-coated electrodes A″, $A^3$, in a suitable electrolyte. The leads $l^2$, $l^3$, to the condenser electrodes $A^4$, $A^5$, are connected to switches $S^2$ both of which may be brought into connection with a tap $t$ from the middle point of the transformer. The supply leads $L^2$, $L^3$, containing switches $S^3$, are connected to taps $t'$, $t'$, brought out from the transformer, which also has taps $t^2$, $t^2$, $t^3$, $t^3$, from points intermediate to $t'$ and $t$ on opposite sides of the latter, as shown. The electrodes A″, $A^3$, of the exciter are connected to the transformer terminals by leads $l^4$, $l^5$. In this arrangement the switches $S^3$ are closed and switches $S^2$ are thrown to the inner contacts, on tap $t$. Unidirectional charging current is thus supplied to the condenser, and after a suitable interval the switches or controllers $S^2$ are thrown to taps $t^3$, then to $t^2$, and finally to $t'$. In this way the main circuit is established through the condenser and the source of current by a series of steps, putting more and more voltage on the condenser until the full line voltage is impressed, but of course the connection can be made by a single step if desired. An analogous arrangement is illustrated in Fig. 4, except that the film-coated exciter electrodes $A^6$, $A^7$, are in the same tank as the condenser electrodes $A^8$, $A^9$, the mode of operation to effect the preliminary charging of the condenser being the same as in the case of Fig. 3. Instead of several switches a single switch, for example one of the "controller" type, may be used as in Fig. 5. In this construction position 1 of the controller J closes the circuit through the supply leads $L^4$, $L^5$, and the auto-transformer T. In position 2 the tap $t^4$ from the middle point of the transformer is connected to the condenser electrodes $A^{10}$, $A^{12}$. In position 3 the condenser electrodes are connected to taps $t^5$, and in position 4 they are connected to taps $t^6$ and thus have higher voltage impressed on them. Finally, in position 5 the condenser electrodes are connected directly to the supply leads $L^4$, $L^5$, and hence receive the full line voltage. The exciter electrodes $A^{13}$, $A^{14}$, are connected to the transformer terminals throughout the above steps, as in the arrangement previously described.

Figure 5:
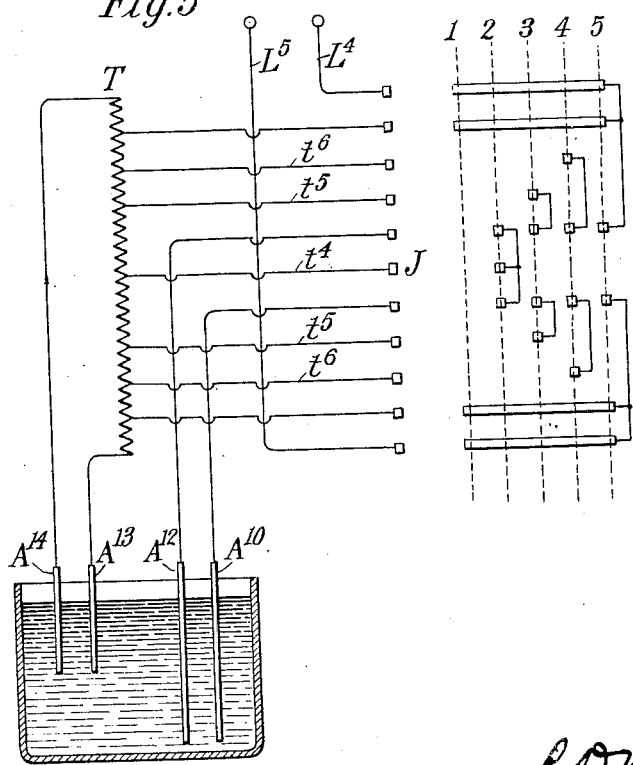

It will be observed that in Figs. 3, 4, and 5 the condenser electrodes are at times short-circuited, it being thus possible to employ a single auto-transformer instead of two.

This short circuit can do no harm if the connection is insulated from the electrolyte; and in that case the only effect is to equalize between the electrodes such charge as the condenser may already have. If, in addition, the short circuit connection is made to the middle point of the transformer and the exciter is connected to the supply leads, the charge already possessed by the condenser will be increased, if it were below normal value, by the exciter E. M. F. If the exciter is not active the short-circuit connection is still insulated from the electrolyte to the extent of the films on the exciter electrodes.

In practice it will usually be found preferable to provide in connection with the controller of Fig. 5 suitable means for preventing too quick movement of the controller from position 2 to position 3, so as to insure ample time for the preliminary excitation of the condenser. Similarly, the switches in Figs. 2, 3, and 4 may be "interlocked" or otherwise constructed in such manner as to make their operation impossible except in the proper sequence and with sufficient time-interval between. Inasmuch as instrumentalities for such purposes are well known it is deemed unnecessary to illustrate any specific examples of the same herein.

The constructions illustrated herein are, as previously stated, effective and convenient embodiments of the invention, which may be embodied in other forms without departure from its proper spirit and scope.

I claim:

1. The combination of an electrolytic condenser, auxiliary exciting means therefor, a source of current, means for opening and closing the circuit between the exciting means and the condenser, and step-by-step means for closing the circuit between the condenser and the said source.

2. The combination of an electrolytic condenser, auxiliary exciting means therefor, a source of current, a transformer connected to the condenser through said exciting means, and a controller connected with the transformer and having a plurality of positions in one of which the source of current is connected to the condenser through the exciting means and in another of which the main circuit is established through the condenser and said source.

3. The combination of an electrolytic condenser, auxiliary exciting means therefor, a source of current, a transformer connected to the exciting means, and a controller for connecting the transformer and condenser to said source, said controller being constructed to connect the exciting means to the condenser in one position of the controller and in succeeding positions to impress higher and higher voltage on the condenser.

4. The combination of an electrolytic condenser, a source of alternating current, means for deriving unidirectional charging current from the source to excite the condenser, and a controller between the source and the condenser and arranged to connect the exciting means to the condenser to excite the same in advance of closing the circuit between the source and the condenser.

In testimony whereof I affix my signature in the presence of two subscribing witnesses.

RALPH D. MERSHON.

Witnesses:
M. LAWSON DYER,
S. S. DUNHAM.